United States Patent [19]

Perkins et al.

[11] 4,120,022

[45] Oct. 10, 1978

[54] PLASTIC MODULAR CASING FOR AN ELECTRONIC WATCH

[76] Inventors: Carroll R. Perkins, 3400 Main St., Santa Ana, Calif. 92707; Jesse F. Cable, III, 4341 Rafael St., Irvine, Calif. 92714; Joseph Link, 26752 Magdalena La., Mission Viejo, Calif. 92675

[21] Appl. No.: 688,983

[22] Filed: May 24, 1976

[51] Int. Cl.² .............................................. H05K 1/04
[52] U.S. Cl. .................................... 361/395; 361/399; 361/401
[58] Field of Search ................ 58/50 R, 23 R, 23 BA; 174/52 FP, 52 S, 52 PE; 317/101 C, 101 R; 429/7, 9; 179/107 H, 107 R; 361/400, 401, 399, 395

[56] References Cited

U.S. PATENT DOCUMENTS

| | | | |
|---|---|---|---|
| 3,759,031 | 9/1973 | McCullough | 58/23 R |
| 3,828,215 | 8/1974 | Bilsback | 317/101 CC |
| 3,863,436 | 2/1975 | Schwarzchild | 317/101 R |
| 3,943,699 | 3/1976 | Daniels | 53/23 BA |
| 3,986,334 | 10/1976 | Harper | 174/52 FP |
| 3,986,335 | 10/1976 | Harper | 174/52 FP |
| 4,033,110 | 7/1977 | Sagarino | 58/23 BA |
| 4,043,113 | 8/1977 | Hart | 58/23 BA |
| 4,053,688 | 10/1977 | Perkins et al. | 58/23 BA |

*Primary Examiner*—David Smith, Jr.
*Attorney, Agent, or Firm*—W. Edward Johansen

[57] ABSTRACT

The present invention is a module frame for use in a modular electronic assembly which includes a light emitting read out source and which also includes a substrate on which an integrated circuit chip is mounted and which is electrically coupled to a pair of batteries. The module frame is non-conductive and has a substrate cavity, a conducting member cavity which is disposed adjacent to the substrate cavity, and a first battery cavity and a second battery cavity both of which are disposed adjacent to the conducting member cavity. A first battery connector is disposed in the first battery cavity and is used for coupling the negative terminal of the battery in the first battery cavity to the casing of the battery in the second battery cavity. A second battery connector is disposed in the second battery cavity and is used for coupling the negative terminal of the battery in the second battery cavity to the substrate. A conducting member formed from a conductive material and adapted to be fitted in the conducting member cavity of the module frame is electrically coupled to the casing of the battery in the first battery cavity. A pair of pushbutton switches are mechanically coupled to the conducting member so that when they are pushed they cause the conducting member to contact a conducting plate which is electrically coupled to the substrate.

2 Claims, 18 Drawing Figures

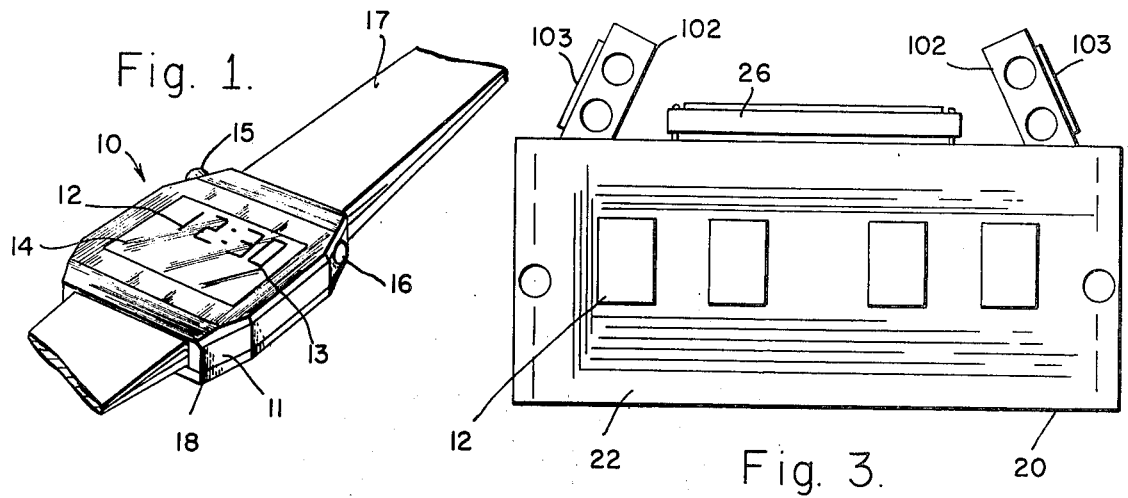
Fig. 1.
Fig. 3.
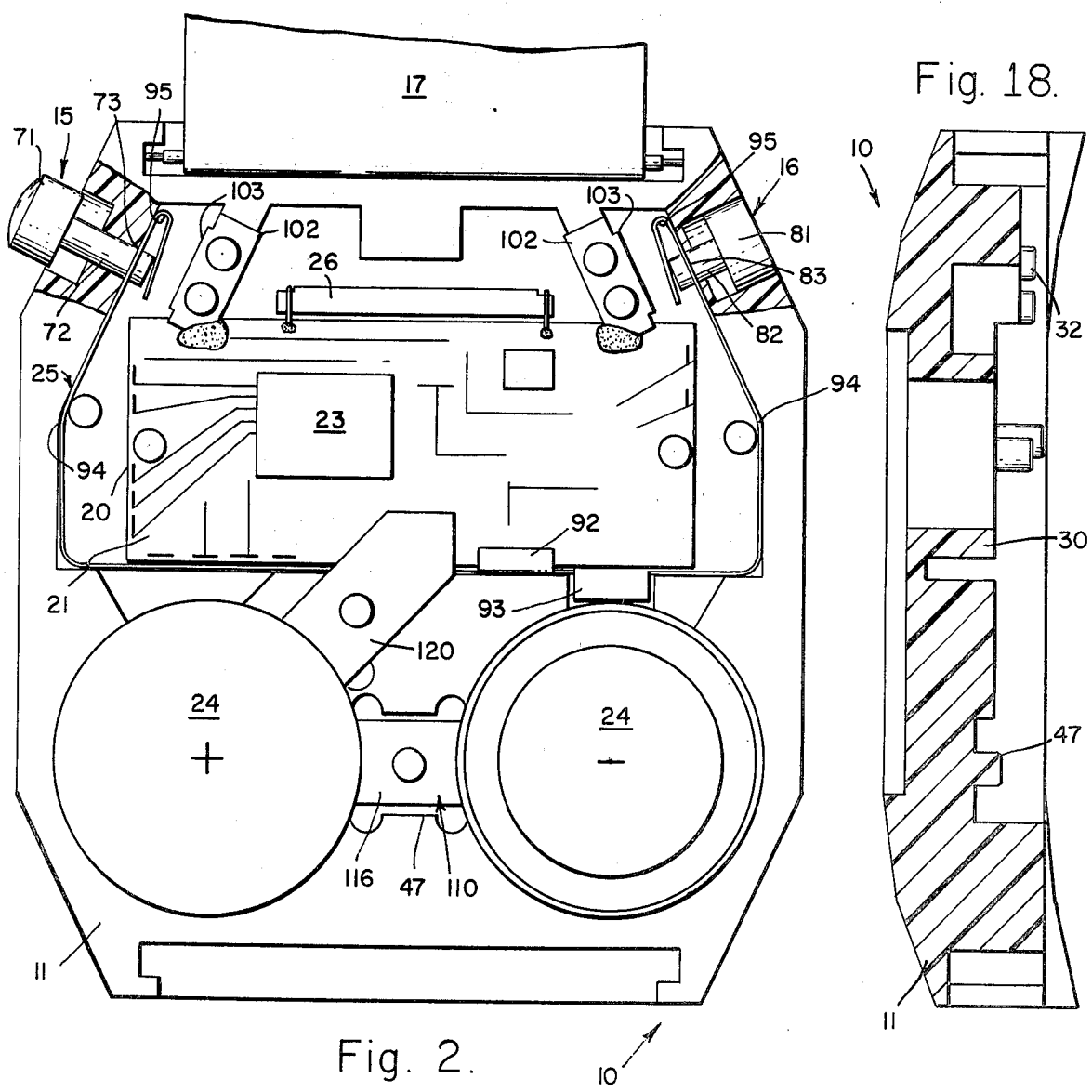
Fig. 18.
Fig. 2.

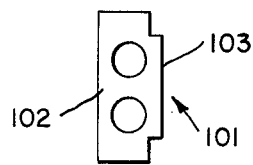
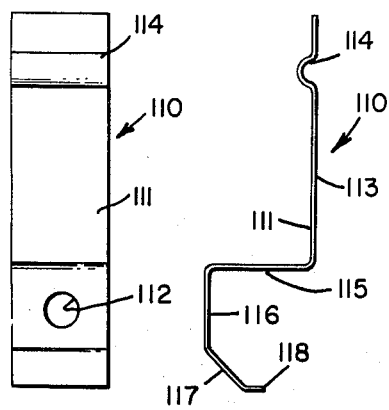
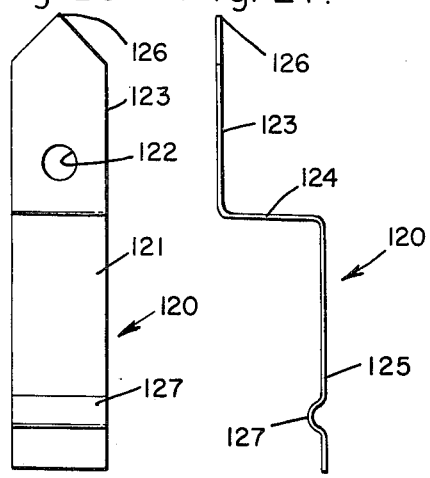
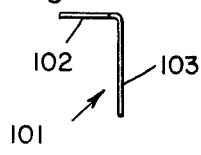
Fig. 12. Fig. 14. Fig. 15. Fig. 16. Fig. 17.
Fig. 13.
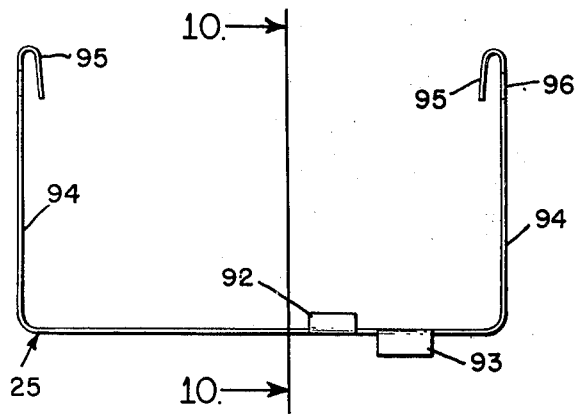
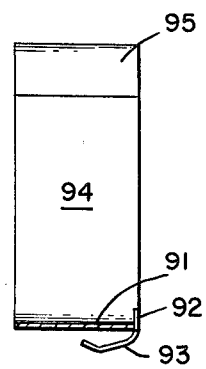
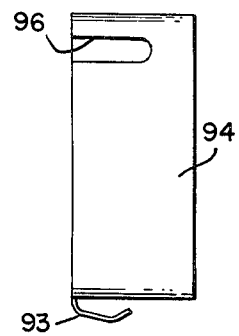
Fig. 9. Fig. 10. Fig. 11.
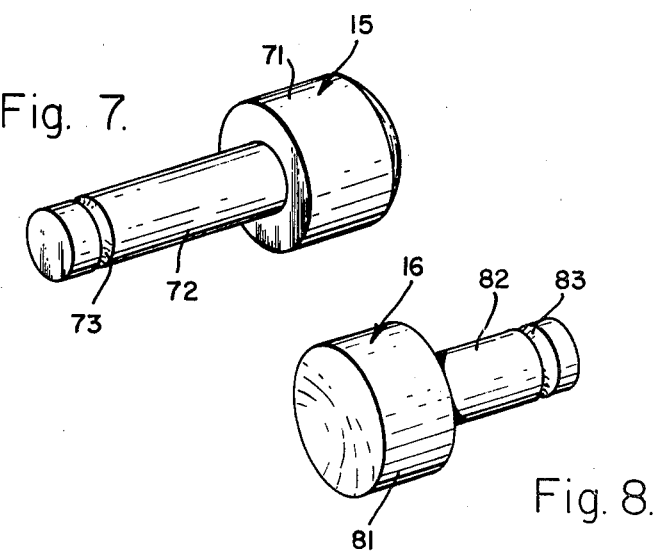
Fig. 7. Fig. 8.

PLASTIC MODULAR CASING FOR AN ELECTRONIC WATCH

BACKGROUND OF THE INVENTION

1. Field of the Invention

The present invention relates to a modular electronic assembly and more particularly to an improved plastic modular casing which includes a battery holder and a substrate holder in an integral unit.

2. Description of the Prior Art

The inventors of the present invention have previously filed an application, Ser. No. 638,312, on Dec. 8, 1975, entitled An Improved Battery Holder in which they have disclosed an improved battery holder which allows a modular electronic assembly to operate while it is outside its casing. One of the features of this invention is that the casing did not have to be formed from a conductive material.

Presently all other modular electronic assemblies are inserted into metal casings which serve not only as battery holders, but also as conduction paths for the electronic circuits in the modular electronic assemblies. Each modular electronic assembly includes a pair of 1½ volt, one cell batteries, a substrate with a printed circuit placed thereon, an electro-optical display which is mounted on the substrate and an integrated circuit chip which is mounted on the substrate and electrically connected to the electro-optical display and the pair of batteries through the printed circuit. U.S. Pat. No. 3,838,568, entitled Electronic Watch Movement Mounting and Connection, issued to Rudolf F. Zurcher and I. Benjamin Merles on Oct. 1, 1974, sets forth a description of a modular electronic assembly which is inserted in a metal casing. The modular electronic assembly includes a substrate that is mounted on a battery holder in such a manner that it may move in a lateral direction across the top surface of the battery holder. At least one of the springs connects itself to the integrated circuit chip and to the metal casing so that when a pushbutton switch is depressed an electrical signal can travel along a conduction path through the metal casing from one of the batteries. It is therefore essential that the casing be metallic or conductive in order for this electronic modular assembly to operate.

The above described modular electronic assembly is inoperable when it is outside the metal casing because there is no conduction path through which the electrical signal can travel from the battery to the integrated circuit chip. Generally, the metal casing includes a ring having a front edge adapted to receive a viewing element such as a watch crystal or a watch glass, and to hold that viewing element in place, and a back element adapted so that it is mechanically coupled to the ring adjacent the back edge thereof. The modular electronic assembly is placed in the ring between the viewing element and the back element, which are both secured at the front edge and the back edge of the ring respectively.

U.S. Pat. No. 3,846,971, entitled Package For Electronic Watch Movement, issued to Ernest C. Ho, Karl H. Reissmueller, and Richard J. Belardi, on Mar. 21, 1973, and teaches a cover positioned over portions of a substrate which has an integrated circuit chip and a display device with a cover being substantially flat so that it extends over the substrate and has downturned falanges along the edge of the cover and also the cover has a transparent window positioned over the display device with the rest of the cover being optically opaque. The casing taught in this patent must also be a conventional metal casing.

In all of the above-described module frames the batteries are disposed beneath the substrates on which the integrated circuit chips are mounted thereby resulting in a relatively thick electronic modular watch. Furthermore, these modular electronic watches are all placed in standardized casings, the external shapes and the colors of which are extremely limited.

Finally, many individuals are allergic to metals and cannot comfortably wear most electronic watches presently available.

SUMMARY OF THE INVENTION

In view of the foregoing factors and conditions characteristic of the prior art it is a primary object of the present invention to provide a plastic module frame that doubles as both a casing and a battery holder.

It is another object of the present invention to provide a modular frame and a substrate which allows a pair of batteries to be disposed adjacent to the substrate rather than beneath the substrate thereby reducing the relative thickness of an electronic modular watch.

It is still another object of the present invention to provide a plastic module frame that can be hermetically sealed so that it becomes a barrier to moisture and dust.

It is yet still another object of the present invention to provide a module frame that can be injection molded out of plastic.

It is still yet another object of the present invention to provide a plastic module frame which can be coated with a plated finish such as gold or nickel or is available in various colors and external shapes.

In accordance with an embodiment of the present invention a module frame for use in a modular electronic assembly which includes a light emitting read out source and which also includes a substrate on which an integrated circuit chip is mounted and which is electrically coupled to a pair of batteries has been described. The module frame is non-conductive and has a substrate cavity, a conducting member cavity which is disposed adjacent to the substrate cavity, and a first battery cavity and a second battery cavity both of which are disposed adjacent to the conducting member cavity. A first battery connector is disposed in the first battery cavity and is used for coupling the negative terminal of the battery in the first battery cavity to the casing of the battery in the second battery cavity. A second battery connector is disposed in the second battery cavity and is used for coupling the negative terminal of the battery in the second battery cavity to the substrate. A conducting member formed from a conductive material and adapted to be fitted in the conducting member cavity of the module frame is electrically coupled to the casing of the battery in the first battery cavity. A pair of pushbutton switches are mechanically coupled to the conducting member so that when they are pushed they cause the conducting member to contact a conducting plate which is electrically coupled to the substrate.

The features of the present invention which are believed to be novel are set forth with particularity in the appended claims. Other objects and many more of the attendant advantages of this invention will be more readily appreciated as the same becomes better understood by reference to the following detailed description and considered in connection with the accompanying drawing in which like reference symbols designate like parts throughout the figures.

DESCRIPTION OF THE DRAWINGS

FIG. 1 is a perspective view of an electronic watch which is enclosed in a plastic modular casing constructed in accordance with the principles of the present invention.

FIG. 2 is a bottom plan view of the plastic modular casing of FIG. 1 showing the electronic components of the electronic watch in place.

FIG. 3 is a top plan view of a substrate used in the electronic watch of FIG. 1.

FIG. 7 is a perspective drawing of a protruding pushbutton.

FIG. 8 is a perspective drawing of a recessed pushbutton.

FIG. 9 is a top plan view of a conducting member used in the electronic watch of FIG. 1.

FIG. 10 is a cross-sectional view of the conducting member of FIG. 9 taken along line 10—10.

FIG. 11 is a side view of the conducting member of FIG. 9.

FIG. 12 is a top plan view of a rectangular conductive plate which is used to connect the conducting member of FIG. 9 to the substrate of the electronic watch of FIG. 1.

FIG. 13 is a side view of the rectangular conductive plate of FIG. 12.

FIG. 14 is a top plan view of a first battery connector used in the electronic watch of FIG. 1.

FIG. 15 is a side view of the first battery connector of FIG. 14.

FIG. 16 is a top plan view of a second battery connector used in the electronic watch of FIG. 1.

FIG. 17 is a side view of the second battery connector of FIG. 16.

FIG. 18 is a cross-sectional view of the plastic modular casing of FIG. 4 taken along line 18—18.

DESCRIPTION OF THE PREFERRED EMBODIMENT

Figure 4:
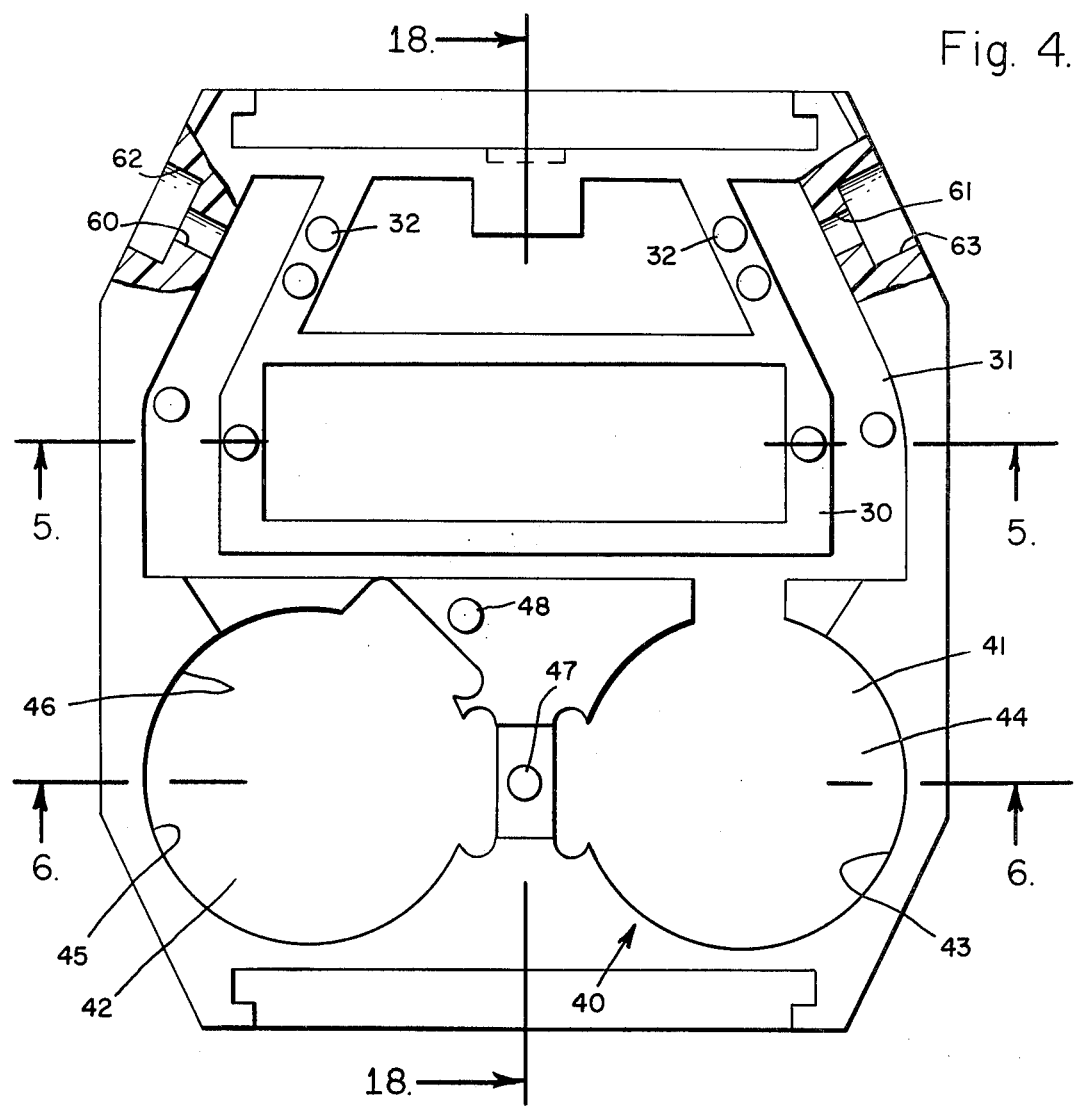
FIG. 4 is a bottom plan view of the plastic modular casing of FIG. 1 without the electronic components of the electronic watch.

The present invention can best be understood by describing its preferred embodiment as illustrated in FIG. 1. Referring to FIG. 1, an electronic watch 10 is enclosed in a plastic modular casing 11 on which a viewing window 12 is disposed on its top surface and aligned with an electro-optical display 13. The electronic watch 10 has a viewing element 14 mounted on the top surface of the plastic modular casing 11 and covering the viewing window 12. The viewing element 14 not only serves for ornamental and protective functions, but also acts as a light filter for the electro-optical display 13. The electronic watch 10 also has a protruding button 15, mounted on one side of the plastic modular casing 11 and a recessed button 16 mounted on another side of the plastic modular casing 11. The electronic watch 10 includes a wristband 17 which is mechanically coupled to the plastic modular casing 11 and a backing plate 18 secured to the back of the plastic modular casing 11.

Referring now to FIG. 2, the electronic watch 10 includes a substrate 20 having a bottom side 21 and a top side 22, which is shown in FIG. 3. The top side 22 of the substrate 20 has the electro-optical display 13, generally an array of light emitting diodes or a liquid crystal, mounted thereon. Referring now back to FIG. 2, the electronic watch 10 also includes an integrated circuit chip 23 mounted on the bottom surface 22 of the substrate 20, a pair of batteries 24, a conducting member 25 which is disposed about the substrate 20 within the plastic modular casing 11, a quartz crystal 26 mounted on the side of the substrate 20 and electrically coupled to the integrated circuit chip 23.

Referring now to FIG. 4, which is a top plan view of the plastic modular casing 11, it can be seen that the plastic modular casing 11 has a substrate mounting member 30 disposed adjacent to its viewing window 12. The plastic modular casing 11 also has a conducting member cavity 31 which is disposed about the periphery of the substrate mounting member 30 and a pair of rectangular mounting members 32 disposed adjacent to each end of the conducting member cavity 31 and adjacent to the substrate mounting member 30.

The plastic modular casing 11 also includes a battery holder 40 which has a first battery cavity 41 and a second battery cavity 42. The first battery cavity has a side surface 43 and a bottom surface 44. The second battery cavity has a side surface 45 and a bottom surface 46. A spacer 47 is disposed between the first battery cavity 41 and the second battery cavity 42. A battery connector mounting member 48 is disposed adjacent to the second battery cavity 42 and the conducting member cavity 31.

The plastic modular casing 11 has a first lower hole 60 and a second lower hole 61 disposed adjacent to the conducting member cavity 31 and in line with the rectangular mounting member 32. The plastic modular casing 11 also has a first upper hole 62 and a second upper hole 63 disposed adjacent to the first lower hole 60 and the second lower hole 61, respectively.

Figure 5:
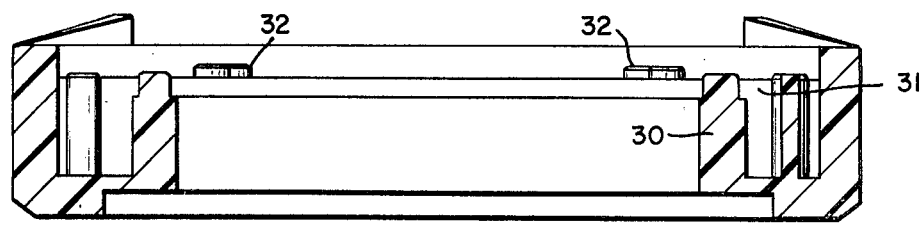
FIG. 5 is a cross-sectional view of the plastic modular casing of FIG. 4 taken along line 5—5.
Figure 6:
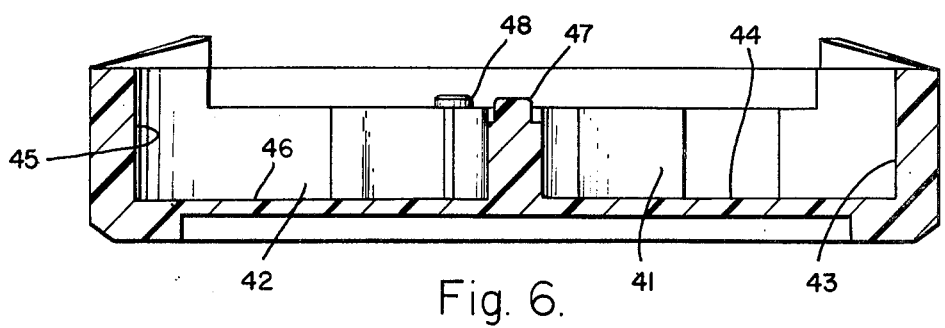
FIG. 6 is a cross-sectional view of the plastic modular casing of FIG. 4 taken along line 6—6.

Referring now to FIG. 5, a cross-sectional view of the plastic modular casing 11 shows a portion of the substrate mounting member 30 and the conducting member cavity 31. Referring to FIG. 6, a cross-sectional view of the plastic modular casing 11, shows the first and second battery cavities 41 and 42 and the spacer 47.

Referring now to FIG. 7, the protruding button 15 includes a first cylindrical member 71 which is of a first particular diameter and a first particular length and which is adapted to be slideably received by the first upper hole 62 in the side of the plastic modular casing 11. The protruding button 15 also includes a second cylindrical member 72 which is of a second particular diameter and a second particular length and which is adapted to be slideably received by the first lower hole 60 in the side of the plastic modular casing 11. The second cylindrical member 72 is joined to the first cylindrical member 71 at one end and has a circular groove 73 at its other end.

Referring now to FIG. 8, the recessed button 16 includes a third cylindrical member 81 which is of the first particular diameter and a third particular length and which is adapted to be slideably received by the second upper hole 63 in the side of the plastic modular casing 11. The recessed button 16 also includes a fourth cylindrical member 82 which is of the second particular diameter and a fourth particular length and which is adapted to be slideably received by the second lower hole 61 in the side of the plastic modular casing 11. The fourth cylindrical member 82 is joined to the third cylindrical member 81 at one end and has a circular groove 83 at its other end.

A top plan view of the conducting member 25 is shown in FIG. 9. The conducting member 25 is U-shaped and has a base 91 which is of a length larger than the longest side of the substrate 20 and to which a first electrically coupling plate 92 for electrically coupling the conducting member 25 to the integrated circuit chip 23 on the substrate 20 and also a second electrically coupling plate 93 are attached. The conducting member 25 also has two legs 94 the ends 95 of which are bent to form a spring, and the length of which is longer than the shortest side of the substrate 20 and long enough so that it may be bent and disposed in the conducting member cavity 31 shown in both FIG. 2 and FIG. 4.

A side cross-sectional view of the conducting member 25 of FIG. 9 is shown in FIG. 10 taken along line 10—10. The second electrically coupling plate 93 extends downward virtually parallel with the base 91 and outside thereof. A side plan of the conducting member 25 is shown in FIG. 11. Each end 95 of the conducting member 25 has a slot 96 outside of the leg 94 and adjacent to the end 95 thereof. Each slot 96 is adapted to slideably receive either the circular groove 73 of the protruding button 15 or the circular groove 83 of the recessed button 16.

A top plan view of a spring electrically coupling device 101 is shown in FIG. 12. The spring electrically coupling device 101 includes a first rectangular conductive member 102 adapted to being mounted adjacent to the conducting member cavity 31 so that it electrically couples the integrated circuit chip 23 to the conducting member 25 when either the protruding button 15 or the recessed button 16 is pushed.

A side plan view of the spring electrically coupling device 101 is shown in FIG. 13. The spring electrically coupling device 101 has a second rectangular conductive member 103 disposed perpendicular to the first rectangular conductive member 102 and adjacent to an edge thereof. The second rectangular conductive member 103 is disposed adjacent to the end 95 of the conducting member 25.

Referring now to FIG. 14, a top plan view shows a first battery connector 110 formed from a rectangular conductive material 111. The first battery connector 110 has a mounting hole 112 adjacent to one of its ends. Referring now to FIG. 15, which is a side plan view of the first battery connector 110, in conjunction with FIG. 14, the first battery connector 110 has a first portion 113 of a fifth particular length with a bulge 114 adjacent to its end, a second portion 115, disposed perpendicular to the first portion 113 and a sixth particular length, which is approximately equal to the thickness of each battery 24, a third portion 116 disposed perpendicular to the second portion 115 and parallel to the first portion 113 and of a length which is approximately equal to the space between the two batteries 24, a fourth portion 117 disposed at an angle of approximately 45° to both the second portion 115 and the third portion 116 and a fifth portion 118 disposed perpendicular to the third portion 116 and adjacent to the fourth portion 117. The first battery connector 110 is disposed so that its first portion 113 rests on the bottom surface 44 of the first battery cavity 41 with its bulge 114 being aligned with the negative terminal of the battery 24 and so that its second portion 115 is disposed adjacent to the side surface 43 of the first battery cavity 41 with the second portion 115 not contacting the casing of the battery 11 which is its positive terminal. The third portion 116 of the first battery connector 110 is mounted on the spacer 47 between the first battery cavity 41 and the second battery cavity 42 and secured thereto by staking. Other methods of securing the battery connector 110 may be gluing together or mechanically joining together with screws. The fifth portion 118 of the first battery connector 110 contacts the casing of the battery 24 in the second battery cavity 42.

A top plan view of the second battery connector 120 is shown in FIG. 16. The second battery connector 120 is formed from a rectangular conductive member 121 and has a mounting hole 122 adjacent to one end. In FIG. 17 a side view of the second battery connector 120 shows that it includes a first portion 123, a second portion 124, and a third portion 125. The first portion 123 has the mounting hole 122 disposed thereon and has an arrow-tip shape 126 at its end. The second portion 124 is disposed perpendicular to the first portion 123. The third portion 125 is disposed perpendicular to the second portion 124 and parallel to the first portion 123 and has a bulge 127 disposed adjacent to the other end of the second battery connector 120. The second battery connector 120 is disposed so its third portion 125 rests on the bottom surface 46 of the second battery cavity 42 with its bulge 127 being aligned with the negative terminal of the battery 24 and so that its second portion 124 is disposed adjacent to the side surface 45 of the second battery cavity 42 with the second portion 124 not contacting the casing of the battery 24. The first portion 123 of the second battery connector 120 is mounted on the connector mounting member 48 and secured thereto by staking.

Referring back again to FIG. 2, the assembly process of the electronic watch 10 in the plastic modular casing 11 includes the insertion of the first battery connector 110 into the first battery cavity 41 with its third portion 116 being secured to the spacer 47 by a staking process, and the insertion of the second battery connector 120 into the second battery cavity 42 with its first portion 123 being secured to the connector mounting member 42 also by a staking process. The assembly process also includes the insertion of the protruding button 15 into the first upper and lower holes 62 and 60 and the insertion of the recessed button 16 into the second upper and lower holes 63 and 61, followed by the insertion of the conducting member 25 into the conducting member cavity 31. The slot 96 at each end 94 of the conducting member 25 slides onto one of the circular grooves 73 or 83 of either the protruding button 15 or the recessed button 16 to form the pushbutton mechanism. The spring electrically coupling device 101 has its first rectangular conductive member 102 disposed on the rectangular conductive mounting member 32 and has its second rectangular conductive member 103 disposed adjacent to the conducting member 25 so that when one of the buttons 15 or 16 is pressed the conducting member 25 contact the second rectangular conductive member 103. The first rectangular conductive member 102 is electrically coupled to the integrated circuit chip 23, which is mounted on the substrate 20.

Referring now to FIG. 18, which is a cross-sectional view of module frame 11 of FIG. 4 along line 18—18, in conjunction with FIG. 2 it can be seen that the batteries 24 are mounted in the first and second battery cavities 41 and 42. The negative terminal of the battery 24 in the first battery cavity 41 is electrically coupled to the casing of the battery 24 in the second battery cavity 42 by the first battery connector 110 which is secured to the modular frame 11 by staking the third portion 116 of the first battery connector 110 to the spacer 48. The negative terminal of the battery 24 in the second battery cavity 42 is electrically coupled to the integrated circuit chip 23 on the substrate 20 by the second battery connector 120.

The modular casing is formed from a plastic material in the preferred embodiment of the present invention, but in alternative embodiments it may be formed from a material that is coated with a non-conductive material such as aluminum modular frame 11 which is then annodized. One of the advantages is that the modular frame 11 may be coated externally with gold, nickel or other metal to give a more expensive, ornamental look. The modular frame may be formed from a variety of colored plastic materials.

Another advantage of the present invention is that the batteries are not mounted underneath the substrate. The location of the batteries at the side of the substrate not only reduces the thickness of the casing for the modular electronic assembly, but also provides an improvement of shock mounting for all components. Furthermore, the location of the batteries at the side of the substrate also allows the light emitting diodes to be optimally placed with regard to a magnifying lens to provide maximum magnification thereby reducing the amount of light emitting diode material required for the electro-optical display.

Finally, a wristband 17 is shown for mounting the modular electronic assembly on a person's wrist. The strap 17 does not have to be secured by a spring loaded pin as shown in FIG. 2, a straight pin placed in the slot formed by the back 18 and the modular casing 11 will suffice. The modular electronic assembly is generally a timepiece, but it can also be a stop watch, a heart monitor, or a timer depending on the electronic components placed inside the modular casing. The modular casing need not be worn on the wrist and can be adapted to a variety of external shapes and may be worn as a pendant or as a pin depending on the wearer's taste.

Until the present invention the modular electronic assemblies did not have modular casings that also served as their battery holders. From the foregoing it can be seen that such a modular casing has been described. The modular casing includes a module frame that has a viewing window aligned with the electro-optical display, two battery cavities and two battery connectors, a conducting member, and a conducting member cavity adjacent to the first and second battery cavities. The modular frame also includes a switch mechanism and a substrate cavity adjacent to the conducting member cavity. It should be noted that the schematics of the modular casing are not drawn to scale and the distances of and between the figures are not to be considered significant.

Accordingly, it is intended that the foregoing disclosure and showing made in the drawing shall be considered only as illustrations of the principles of the present invention.

What is claimed is:

1. In a modular electronic assembly which includes an integrated circuit chip electrically powered by a pair of batteries and an electro-optical display which is operated by the integrated circuit chip, a switch mechanism for use in combination with a nonconductive modular casing, that serves as a casing for the modular electronic assembly and a battery holder for the pair of batteries which includes:
    a. non-conductive modular frame that has a substrate cavity, in which the integrated circuit chip is disposed, a conducting member cavity disposed adjacent to said substrate cavity, both of which are disposed adjacent to said conducting member cavity;
    b. a first battery connector disposed in said first battery cavity and used for coupling electrically the negative terminal of the battery in said first battery cavity to the casing of the battery in said second battery cavity;
    c. a second battery connector disposed in said second battery cavity and used for electrically coupling the negative terminal of the battery in said second battery cavity to the integrated circuit chip; and
    d. a conducting member formed from a resilient, conductive material and adapted to be fitted into said conducting member cavity of said modular frame and electrically coupled to the casing of the battery in said first battery cavity and to the integrated circuit chip, a portion of said conducting member being adapted to be formed into a spring mechanism, said switch comprising:
        a. a button having a first cylindrical portion of a first particular diameter and adapted to slideably fit into a lower hole drilled in the side of said modular frame adjacent to said conducting member cavity and a second cylindrical portion of a second particular diameter which is larger than the first particular diameter, and adapted to slideably fit into an upper hole adjacent to said lower hole, said button also having a groove adjacent to the end of said first cylindrical portion and adapted to being connected mechanically to said portion of said conducting member in order to form a spring mechanism; and
        b. a conducting plate electrically coupled to the integrated circuit chip and mounted adjacent to said conducting spring so that when said button is pressed said conducting member electrically contacts said conducting plate.

2. In a modular electronic assembly which includes an integrated circuit chip electrically powered by a pair of batteries and an electro-optical display which is operated by the integrated circuit chip, a non-conductive modular casing according to claim 1 wherein said button and said modular casing are formed from a plastic material.

* * * * *